United States Patent
York et al.

(10) Patent No.: US 10,274,167 B2
(45) Date of Patent: Apr. 30, 2019

(54) LIGHT-EMITTING DEVICES WITH REFLECTIVE ELEMENTS

(71) Applicant: Quarkstar LLC, Las Vegas, NV (US)

(72) Inventors: Allan Brent York, Fort Langley (CA); Roland H. Haitz, Portola Valley, CA (US); Louis Lerman, Las Vegas, NV (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 15/919,103

(22) Filed: Mar. 12, 2018

(65) Prior Publication Data

US 2019/0056088 A1    Feb. 21, 2019

Related U.S. Application Data

(63) Continuation of application No. 14/427,980, filed as application No. PCT/US2013/059544 on Sep. 12, 2013, now Pat. No. 9,915,410.

(Continued)

(51) Int. Cl.

| | |
|---|---|
| *F21V 13/04* | (2006.01) |
| *F21V 7/00* | (2006.01) |
| *G02B 19/00* | (2006.01) |
| *F21K 9/62* | (2016.01) |
| *F21V 7/04* | (2006.01) |

(Continued)

(52) U.S. Cl.
CPC ............ *F21V 13/04* (2013.01); *F21V 7/0033* (2013.01); *F21V 7/0066* (2013.01); *G02B 19/0028* (2013.01); *G02B 19/0066* (2013.01); *F21K 9/62* (2016.08); *F21V 7/041* (2013.01); *F21Y 2113/13* (2016.08); *F21Y 2115/10* (2016.08)

(58) Field of Classification Search
CPC ...... F21V 13/04; F21V 7/0066; F21V 7/0033; F21V 7/041; G02B 29/0028; G02B 19/0066; F21K 9/62; F21Y 2113/13; F21Y 2115/10
See application file for complete search history.

(56) References Cited

U.S. PATENT DOCUMENTS

| | | |
|---|---|---|
| 3,960,579 A | 6/1976 | Broerner |
| 4,038,448 A | 7/1977 | Boyd et al. |

(Continued)

FOREIGN PATENT DOCUMENTS

| | | |
|---|---|---|
| EP | 2293354 | 3/2011 |
| WO | WO2001007828 | 2/2001 |

(Continued)

OTHER PUBLICATIONS

Allen et al., "A nearly ideal phosphor-converted white light-emitting diode," Applied Physics Letters, vol. 92 (2008) 3 pages.

(Continued)

*Primary Examiner* — Kevin Quarterman
(74) *Attorney, Agent, or Firm* — Fish & Richardson P.C.

(57) ABSTRACT

A variety of light-emitting devices are disclosed that are configured to output light provided by a light-emitting element (LEE). In general, embodiments of the light-emitting devices feature two or more light-emitting elements, a scattering element that is spaced apart from the light-emitting elements, an extractor element coupled to the scattering element, and a reflective element that is configured and arranged to reflect light emitted from the light-emitting elements.

23 Claims, 11 Drawing Sheets

Related U.S. Application Data

(60) Provisional application No. 61/700,724, filed on Sep. 13, 2012.

(51) Int. Cl.
  *F21Y 115/10* (2016.01)
  *F21Y 113/13* (2016.01)

(56) References Cited

U.S. PATENT DOCUMENTS

| | | |
|---|---|---|
| 4,240,692 A | 12/1980 | Winston |
| 4,301,461 A | 11/1981 | Asano |
| 4,374,749 A | 2/1983 | Cusano et al. |
| 4,389,118 A | 6/1983 | Yuasa et al. |
| 4,797,609 A | 1/1989 | Yang |
| 4,907,044 A | 3/1990 | Schellhorn et al. |
| 5,001,609 A | 3/1991 | Gardner et al. |
| 5,055,892 A | 10/1991 | Gardner et al. |
| 5,268,635 A | 12/1993 | Bortolini et al. |
| 5,282,088 A | 1/1994 | Davidson |
| 5,335,152 A | 8/1994 | Winston |
| 5,424,855 A | 6/1995 | Nakamura et al. |
| 5,727,108 A | 3/1998 | Hed |
| 5,856,727 A | 1/1999 | Schroeder et al. |
| 6,095,655 A | 8/2000 | Bigliati et al. |
| 6,111,367 A | 8/2000 | Asano et al. |
| 6,155,699 A | 12/2000 | Miller et al. |
| 6,236,331 B1 | 5/2001 | Dussureault |
| 6,479,942 B2 | 11/2002 | Kimura |
| 6,495,964 B1 | 12/2002 | Muthu et al. |
| 6,527,411 B1 | 3/2003 | Sayers |
| 6,617,560 B2 | 9/2003 | Forke |
| 6,642,618 B2 | 11/2003 | Yagi et al. |
| 6,819,505 B1 | 11/2004 | Cassarly et al. |
| 7,015,514 B2 | 3/2006 | Baur et al. |
| 7,091,653 B2 | 8/2006 | Ouderkirk et al. |
| 7,151,283 B2 | 12/2006 | Reeh et al. |
| 7,286,296 B2 | 10/2007 | Chaves et al. |
| 7,306,960 B2 | 12/2007 | Bogner et al. |
| 7,329,907 B2 | 2/2008 | Pang |
| 7,329,998 B2 | 2/2008 | Jungwirth |
| 7,344,902 B2 | 3/2008 | Basin et al. |
| 7,355,284 B2 | 4/2008 | Negley |
| 7,514,867 B2 | 4/2009 | Yano et al. |
| 7,522,802 B2 | 4/2009 | Shiau et al. |
| 7,828,453 B2 | 11/2010 | Tran et al. |
| 7,859,190 B2 | 12/2010 | Shi |
| 7,889,421 B2 | 2/2011 | Narendran et al. |
| 8,007,118 B2 | 8/2011 | O'Neill et al. |
| 8,083,364 B2 | 12/2011 | Allen |
| 8,168,998 B2 | 5/2012 | David et al. |
| 8,314,537 B2 | 11/2012 | Gielen et al. |
| 8,362,695 B2 | 1/2013 | Aanegola et al. |
| 8,436,380 B2 | 5/2013 | Aanegola et al. |
| 2003/0117087 A1 | 6/2003 | Barth et al. |
| 2003/0235050 A1 | 12/2003 | West et al. |
| 2004/0052076 A1 | 3/2004 | Mueller et al. |
| 2004/0150991 A1 | 8/2004 | Ouderkirk et al. |
| 2005/0023545 A1 | 2/2005 | Camras et al. |
| 2005/0075234 A1 | 4/2005 | Wolff et al. |
| 2005/0127833 A1 | 6/2005 | Tieszen |
| 2005/0185416 A1 | 8/2005 | Lee et al. |
| 2005/0243570 A1 | 11/2005 | Chaves et al. |
| 2005/0269582 A1 | 12/2005 | Mueller et al. |
| 2006/0152140 A1 | 7/2006 | Brandes |
| 2006/0152931 A1 | 7/2006 | Holman |
| 2006/0255353 A1 | 11/2006 | Taskar et al. |
| 2007/0018102 A1 | 1/2007 | Braune et al. |
| 2007/0256453 A1 | 11/2007 | Barnes et al. |
| 2007/0257267 A1 | 11/2007 | Leatherdale et al. |
| 2007/0273282 A1 | 11/2007 | Radkov et al. |
| 2008/0054280 A1 | 3/2008 | Reginelli et al. |
| 2008/0079910 A1 | 4/2008 | Rutherford et al. |
| 2008/0080166 A1 | 4/2008 | Duong et al. |
| 2008/0101754 A1 | 5/2008 | Parker et al. |
| 2008/0112183 A1 | 5/2008 | Negley |
| 2008/0297027 A1 | 12/2008 | Miller et al. |
| 2009/0200939 A1 | 8/2009 | Lenk |
| 2009/0201677 A1 | 8/2009 | Hoelen et al. |
| 2009/0272996 A1 | 11/2009 | Chakraborty |
| 2009/0310352 A1 | 12/2009 | Chang |
| 2010/0066236 A1 | 3/2010 | Xu et al. |
| 2010/0073927 A1 | 3/2010 | Lewin et al. |
| 2010/0097821 A1 | 4/2010 | Huang et al. |
| 2010/0123386 A1 | 5/2010 | Chen |
| 2010/0134016 A1 | 6/2010 | York et al. |
| 2010/0148151 A1 | 6/2010 | Camras et al. |
| 2010/0172120 A1 | 7/2010 | Wegh |
| 2010/0232134 A1 | 9/2010 | Tran |
| 2010/0263723 A1 | 10/2010 | Allen |
| 2010/0264432 A1 | 10/2010 | Liu et al. |
| 2010/0290226 A1 | 11/2010 | Harbers |
| 2010/0301367 A1 | 12/2010 | Nakamura et al. |
| 2010/0308354 A1 | 12/2010 | David et al. |
| 2011/0080108 A1 | 4/2011 | Chiang et al. |
| 2011/0089817 A1 | 4/2011 | Lyons et al. |
| 2011/0176091 A1 | 7/2011 | Boonekamp |
| 2011/0182065 A1 | 7/2011 | Negley et al. |
| 2011/0227037 A1 | 9/2011 | Su |
| 2011/0267800 A1 | 11/2011 | Tong et al. |
| 2011/0267801 A1 | 11/2011 | Tong et al. |
| 2011/0273882 A1 | 11/2011 | Pickard |
| 2011/0291130 A1 | 12/2011 | Diana et al. |
| 2011/0298371 A1 | 12/2011 | Brandes et al. |
| 2012/0033403 A1 | 2/2012 | Lamvik et al. |
| 2012/0039073 A1 | 2/2012 | Tong |
| 2012/0068205 A1 | 3/2012 | Galvez et al. |
| 2012/0112661 A1 | 5/2012 | Van de Ven et al. |
| 2012/0119221 A1 | 5/2012 | Negley |
| 2012/0127694 A1 | 5/2012 | Richardson |
| 2012/0140436 A1 | 6/2012 | Yang et al. |
| 2012/0147296 A1 | 6/2012 | Montgomery et al. |
| 2012/0181565 A1 | 7/2012 | David et al. |
| 2012/0187441 A1 | 7/2012 | Li |
| 2012/0327656 A1 | 12/2012 | Ramer et al. |
| 2013/0021776 A1 | 1/2013 | Veerasamy et al. |
| 2013/0201715 A1 | 8/2013 | Dau et al. |
| 2014/0333198 A1 | 11/2014 | Allen et al. |
| 2015/0003059 A1 | 1/2015 | Haitz et al. |

FOREIGN PATENT DOCUMENTS

| | | |
|---|---|---|
| WO | WO2001027962 | 4/2001 |
| WO | WO2003017729 | 2/2003 |
| WO | WO2004076916 | 9/2004 |
| WO | WO2007081812 | 4/2009 |
| WO | WO2012001645 | 1/2012 |
| WO | WO2013078463 | 5/2013 |

OTHER PUBLICATIONS

Allen et al., "ELiXIR—Solid-State Luminaire With Enhanced Light Extraction by Internal Reflection," Journal of Display Technology, vol. 3, No. 2, Jun. 2007 pp. 155-159.

Carclo Technical Plastics "Luxeon® I 20 & 26.5mm Range," downloaded from the internet at: http://docs-europe.electrocomponents.com/webdocs/0dcb/0900766b80dcbbeb.pdf on Oct. 30, 2012, 31 pages.

Carr et al., "One-Watt GaAs p-n Junction Infrared Source," Applied Physics Letters, vol. 3, No. 10, Nov. 15, 1963, pp. 173-175.

Carr, "Photometric Figures of Merit for Semiconductor Luminescent Sources Operating in Spontaneous Mode," Infrared Physics, 1966, vol. 6, pp. 1-19.

Intematix, "Design Considerations for ChromaLit™ Ellipse, Candle, and Dome Remote Phosphor Light Sources," Jan. 11, 2012, downloaded from the internet at: http://www.intematix.com/uploads/files/imx-design-considerations-ecd-app-note.pdf , on Oct. 30, 2012, 23 pages.

Intematix, "Mixing Chamber Design Considerations for ChromaLit™ Remote Phosphor Light Sources," Aug. 29, 2012, downloaded from the internet at: http://www.intematix.com/uploads/files/intematix_

(56) References Cited

OTHER PUBLICATIONS mixing_chamber_design_for_chromalit.pdf on Oct. 30, 2012, 12 pages.

Liu et al., "Effects of Phosphor's Location on LED Packaging Performance," 2008 International Conference on Electronic Packaging Technology & High Density Packaging (ICEPT-HDP 2008), 7 pages.

Liu et al., "Effects of Phosphor's Thickness and Concentration on Performance of White LEDs," 2008 International Conference on Electronic Packaging Technology & High Density Packaging (ICEPT-HDP 2008), 6 pages.

Mims III, Forrest, "Sun Photometer with Light-Emitting Diodes as Spectrally Selective Detectors," Applied Optics 31, 6965-6967, 1992.

Notification of Transmittal of the International Search Report and the Written Opinion of the International Searching Authority, International Application No. PCT/US2013/059544, dated Feb. 14, 2014, 9 pages.

LIGHT-EMITTING DEVICES WITH REFLECTIVE ELEMENTS

CROSS-REFERENCE TO RELATED APPLICATIONS

This application is a continuation of U.S. patent application Ser. No. 14/427,980, filed Mar. 12, 2015, which is a U.S. National Stage of International Application No. PCT/US2013/059544, filed Sep. 12, 2013, which claims benefit under 35 U.S.C. § 119(e)(1) of U.S. Provisional Application No. 61/700,724, filed on Sep. 13, 2012, the entire contents of which are incorporated by reference herein.

TECHNICAL FIELD

This disclosure relates to light-emitting devices that include a solid-state based optical system with reflective elements to generate various illumination patterns.

BACKGROUND

Historically, many lighting system luminaires have relied upon a single light source and single primary reflector and in some implementations, a single final primary diffuser or "window" that surrounds the light source and creates some type of illumination pattern, such as spot light or area light depending upon the photometric needs in a given application. The light source was generally a nominally 4 pi steradian emitter from either a filament or an electric discharge arc contained in one, or more, volumetric enclosures (e.g., light bulbs.) Given the lack of control over the spatial emission pattern and fixed spectral content inherent in the underlying technologies, the luminaire designer has usually relied upon the creation of a fairly large proximate optical system around the light source to achieve a desired, relatively invariant photometric distribution. This single light source to one function paradigm has prevailed in the lighting industry for well over a century.

With the advent of high efficiency light-emitting diode (LED) sources, as known in the art, it is possible to obtain large light flux packages including LED die material (e.g., about 1 $mm^2$) along with an appropriate wavelength converting material (e.g., phosphor) placed in proximity to the die to create a composite light spectrum that is close to the Planckian locus. As commonly known in the art, the Planckian locus is also referred to as the black body locus, which mathematically refers to the set of points that characterize light emitted by a black body radiator as a function of the temperature of the black body in a particular chromaticity coordinate space. These packages are now showing efficacies in the range of 150 lumens/watt such that, for example, a 1 watt device can be capable of producing 150 lumens of light or about $1/4^{th}$ of the flux of a standard 60 watt incandescent lamp. If these individual sources are differentiated and/or operated differentially then it is possible to piecewise electronically parse a previously larger lighting function into smaller functions in both spectral and spatial respects.

Arrays of powerful compact LED dies or array packages are also available that can provide high granularity of control as desired for various applications. Some LED dies can have a high current density with high surface exitance in the shorter wavelength blue, or even ultraviolet, regions of the spectrum such that high optical energy densities can be achieved with less than 0.2 $mm^2$ of material, for example. As epitaxial materials improve in terms of external quantum efficiencies and energy densities, smaller elements of light can be harnessed in efficient optical structures.

Therefore, a reduction in the size of the finished optical structure is possible, and hence the etendue of the light source which can be advantageously used to create better optically controlled systems using less material at much lower costs to the final application. The use of an LED is but one example of a "light emitting element" otherwise known as an "LEE" which includes Light Emitting Diodes, laser diodes, superluminescent diodes, or organic light emitting diodes and other compact semiconducting devices as are known in the art.

SUMMARY

Individual LED sources can be electronically and optically isolated in a luminaire design where a variety of lighting functions can be electronically controlled independently such that the luminaire can be tuned spectrally and optically. This can be accomplished by dimming individual LEDs independently, or inter-dependently, such that the composite light output from all of the LEDs in the system creates a specific spectral far field illumination distribution that supports functions, such as human biological activation functions, task orientation, aesthetic functions, performance or efficiency.

In one aspect, a light-emitting device includes a base substrate; two or more light-emitting elements (LEEs) disposed on the base substrate; a first optical element having a first surface spaced apart from the LEEs and positioned to receive light from at least one of the LEEs, the first optical element having a refractive index $n_1$ and configured to scatter light from the LEEs; a second optical element having an exit surface, the second optical element being transparent and having a refractive index $n_2$ that is equal to or larger than $n_1$, the second optical element being optically coupled with the first optical element and arranged to receive at least a portion of light through the first optical element; and a reflective element having a first reflective surface and a second reflective surface, the first reflective surface arranged to reflect light from one or more first LEEs of the two or more LEEs, the second reflective surface arranged to reflect light from one or more second LEEs of the two or more LEEs.

The foregoing and other embodiments can each optionally include one or more of the following features, alone or in combination. In some embodiments, the second reflective surface opposes first reflective surface. In some embodiments, the reflective element extends from the base substrate toward the first optical element. In some embodiments, the reflective element extends between the base substrate and the first optical element, into the second optical element, through the exit surface, or from the first optical element toward the base substrate. In some embodiments, the first and second reflective surfaces are arranged perpendicular to the base substrate. In some embodiments, the first and second reflective surfaces are planar.

In some embodiments, the light-emitting device further includes two additional reflective elements and the two or more LEEs include at least three LEEs, the reflective element and the two additional reflective elements separating the one or more first LEEs, the one or more second LEEs different from the first LEEs, and one or more third LEEs different from the first and second LEEs. In some embodiments, the light-emitting device further includes three or more additional reflective elements and the two or more LEEs include at least four LEEs, the reflective element and the three or more additional reflective elements separating respective LEEs of the at least four LEEs.

In some embodiments, power to the one or more first LEEs and the one or more second LEEs can be controlled independently. In some embodiments, power to each LEE of the two or more LEEs can be controlled separately. In some embodiments, the first optical element can be configured to isotropically scatter light passing therethrough. In some embodiments, the first optical element can include inelastic scattering centers and/or elastic scattering centers.

In some embodiments, the one or more first LEEs can be configured to provide light having a first spectral power distribution, and the one or more second LEEs can be configured to provide light having a second spectral power distribution different from the first spectral power distribution. In some embodiments, at least two of the first LEEs have different spectral power distributions and the at least two of the first LEEs can be independently controlled. In some embodiments, at least two of the second LEEs have different spectral power distributions and the at least two of the second LEEs can be independently controlled. In some embodiments, the first optical element can be shaped such that at least some light scattered from the first optical element via the first surface propagates directly back to another location of the first surface.

In some embodiments, the base substrate can have a reflective base surface facing the first optical element. In some embodiments, the base surface can be planar. In some embodiments, the base surface can include specular reflective portions. In some embodiments, the base surface can include diffuse reflective portions. In some embodiments, the first optical element can have a substantially uniform thickness. In some embodiments, the exit surface can be shaped such that an angle of incidence on the exit surface of the light provided by the first optical element that directly impinges on the exit surface is less than a critical angle for total internal reflection. The exit surface can be shaped such that an angle of incidence on the exit surface of light that directly impinges on the exit surface is less than the Brewster angle.

In some embodiments, an axis of symmetry of the first optical element and an axis of symmetry of the second optical element can be collinear. In some embodiments, the exit surface can have a spherical shape. In some embodiments, a medium adjacent to the first surface can be a gas.

In another aspect, a light-emitting device includes a base substrate; multiple light-emitting elements (LEEs) disposed on the base substrate; multiple first optical elements, each first optical element of the plurality of first optical elements having a first surface spaced apart from the plurality of LEEs, positioned to receive light from one or more of the plurality of LEEs, and configured to scatter light passing therethrough; multiple second optical elements, each second optical element of the multiple second optical elements having an exit surface, being transparent and optically coupled with a respective first optical element, and arranged to receive light therefrom; and one or more reflective elements disposed between LEEs of the multiple LEEs, the one or more reflective elements having reflective surfaces arranged to reflect portions of light emitted from the plurality of LEEs, and wherein the one or more reflective elements separate adjacent second optical elements.

The foregoing and other embodiments can each optionally include one or more of the following features, alone or in combination.

DETAILED DESCRIPTION

Various embodiments are described within the context of an asymmetric (or symmetric) optical light-emitting device to create a highly efficient, and variably tunable and steerable device that can be used with secondary and tertiary optics to enable the creation of new types of luminaires or light sources that are applicable to a wide range of lighting functions. These luminaires can be passively and actively tailored to the needs of users and various tasks in the illuminated environment. Furthermore, with the inclusion of advanced controls and sensing, these light-emitting devices can dynamically adapt to users and tasks throughout the day or over the lifetime of the system.

Figure 1:
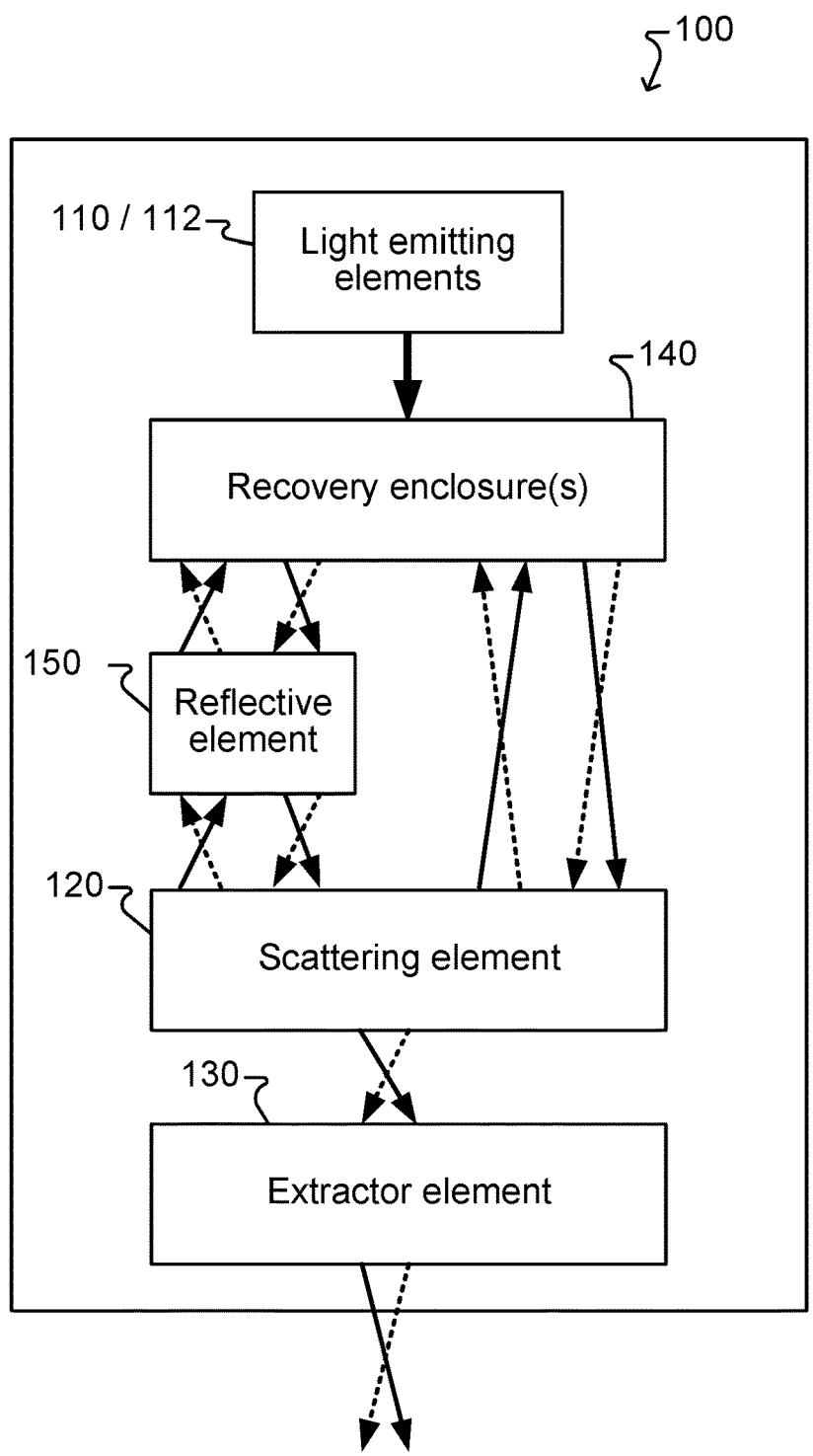
FIG. 1 shows a schematic diagram of an example of a light-emitting device with a reflective element.

FIG. 1 shows a schematic diagram of an example of a light-emitting device 100 that includes multiple light-emitting elements (LEEs) 110, 112, a scattering element 120 (also referred to as a first optical element), an extractor element 130 (also referred to as a second optical element), a recovery enclosure 140 (also referred to as cavity) that is formed, at least in part, by the scattering element 120, and a reflective element 150. The light-emitting device 100 can efficiently provide broadband, homogenized light to an ambient environment across a broad range of angles.

The scattering element 120 has a first surface (also referred to as a light-entry surface) spaced apart from the light-emitting elements 110, 112 and positioned to receive the light from the light-emitting elements 110, 112. The scattering element 120 includes scattering centers arranged to substantially isotropically scatter the light from the light-emitting elements 110, 112 and to provide scattered light. The scattering element 120 can include elastic scattering centers, inelastic scattering centers, or both. In some implementations, the scattered light can include elastically scattered pump light and inelastically scattered pump light. The elastically scattered pump light includes photons that have undergone elastic scattering at the scattering centers, and the inelastically scattered pump light includes photons that have undergone inelastic scattering at the scattering centers. Photon energy, and therefore wavelength, is conserved in elastic scattering. For example, the spectral distribution of photons remains substantially unchanged due to elastic scattering. Rayleigh scattering is an example of elastic scattering. In inelastic scattering, which includes Raman scattering, photon energy is shifted. Accordingly, inelastic scattering changes the spectral distribution of photons.

The scattering element 120 can substantially randomize the direction of propagation of light received from light-emitting elements 110, 112 by scattering substantially all light entering the scattering element 120, while allowing substantial portions of light to pass through the scattering element 120. The extractor element 130 is formed from a transparent material, such as a transparent glass or a transparent organic polymer, having an exit surface. The exit surface of the extractor element 130 is generally a curved, transparent surface. In other words, changes in the scattered light passing through the exit surface can be described, for example by Snell's law of refraction, as opposed to an opaque or diffuse surface where further scattering of transmitted light occurs.

The extractor element 130 is in contact with the scattering element 120, such that there is an optical interface between the scattering and extractor elements at the place of contact. Moreover, the extractor element 130 is arranged so that light scattered through the optical interface enters the extractor element 130. Light from the scattering element 120 that directly reaches the exit surface of the extractor element 130 is referred to as forward light. In some implementations, the extractor element 130 has an elongate shape. Such an elongation can be parallel, oblique or perpendicular, for example, to an optical axis of the light-emitting device. The extractor element 130 can be shaped to partially or fully circumscribe the scattering element 120. Such an extractor element 130 provides one or more hollows or cavities and one or more openings or holes. Openings and holes form apertures to receive light from the light-emitting elements 110, 112 and direct the light at the first surface of the scattering element 120. Accordingly, the extractor element 130 is shaped as a shell, a spherical shape (e.g., a hemisphere or partial sphere,) or other shape with a certain thickness or thickness profile.

In some embodiments, the scattering element 120 is partially or fully surrounded by the extractor element 130 and the optical interface includes corresponding portions of the surface of the scattering element. In some embodiments, the extractor element 130 and the scattering element 120 are integrally formed. In an example of such an integral formation, the optical interface is a notional interface drawn between regions of a corresponding integrally formed object, such that the optical interface substantially includes interfaces formed by the scattering centers. This may be the case, when the scattering element 120 includes scattering centers inside a material that is the same as the material used to form the extractor element 130, for example. In this manner, the scattering element 120 can be shaped as a tile, disc, spherical or aspherical shell or dome, tubular, prismatic or other elongate shell, or other structure to provide a predetermined spatial profile of conversion properties to achieve a predetermined light-output profile including color and/or brightness homogeneity from the scattering element 120.

In some implementations, an integrally formed extractor/scattering element includes scattering centers that are uniformly distributed throughout the integrally formed element. Accordingly, in such implementations, the extractor element and the scattering element are the same optical element.

The recovery enclosure 140 encloses a medium, such as a gas (e.g., air), adjacent the first surface of the scattering element 120. The recovery enclosure 140 is arranged and configured to recover a portion of the scattered light that propagates through the first surface into the medium. This means that the recovery enclosure 140 redirects at least a portion of the scattered light back towards the scattering element 120 so that at least some of this light exits the scattering element 120 into the extractor element 130. The design of the recovery enclosure 140 can be selected to reduce the amount of scattered light that returns to the light-emitting elements 110, 112 (where it can be absorbed). For instance, the recovery enclosure 140 can be defined by the first surface of the scattering element 120 and/or one or more additional optical components that redirect such backscattered light and/or via certain configuration of the scattering element as described herein. For example, the recovery enclosure 140 can be formed, at least in part, by the first surface of the scattering element 120 and the reflective element 150.

The reflective element 150 transects at least a portion of the light-emitting device 100 and provides a means to control the degree of intermixing of light between the sectors of the device that would impact, for example, the blending of light. At least one light emitting element is placed in each area of the light emitting device that is defined in part by the reflective element 150 such that the reflective element redirects a portion of light emitted by the respective light emitting elements. For example, the light emitting element 110 can be placed proximate to a first surface of the reflective element 150 and the light emitting element 112 can be placed proximate to a second surface of the reflective element 150.

The relative height and/or position of the reflective element controls the degree by which light from each light emitting element is mixed prior to, and after being output from the light emitting device 100. For example, the near field luminance of the light output can be controlled such that it is continuously variable across the light output surface to a virtually discontinuous change at the boundary defined by the reflective element 150. In some implementations, the reflective element 150 can be a continuous sheet or have voids for interblending of light in the lower cavity, for example. In some implementations, the reflective element 150 can have one end coincident with a plane defined by the light emitting elements 110, 112 or start at some distance above the plane as may be desired.

In general, the shape, size, and composition of the recovery enclosure 140, reflective element 150, scattering element 120, and extractor element 130 can vary. The characteristics of each component are selected based on the characteristics of the other components and the desired performance of the light-emitting device 100. This will be apparent from the discussion of specific embodiments of light-emitting devices described below.

While a single light-emitting element can be placed in each area defined in part by the reflective element, embodiments can, in general, include more than one light-emitting element in one or more of the areas. The light-emitting elements can be configured to provide light having different or similar spectral power distributions during operation. For example, the spectral power distribution of light emitted by one or more of the light-emitting elements (also referred to as pump light) can be blue, and the spectral power distribution of light emitted by one or more other light-emitting elements can be red. In this example, the scattering element provides mixed light including the red scattered light from the red light-emitting element(s) and the yellow converted light from the blue light-emitting element(s), such that the mixed light has a mixed spectral power distribution (that includes yellow and red).

Figure 2A:
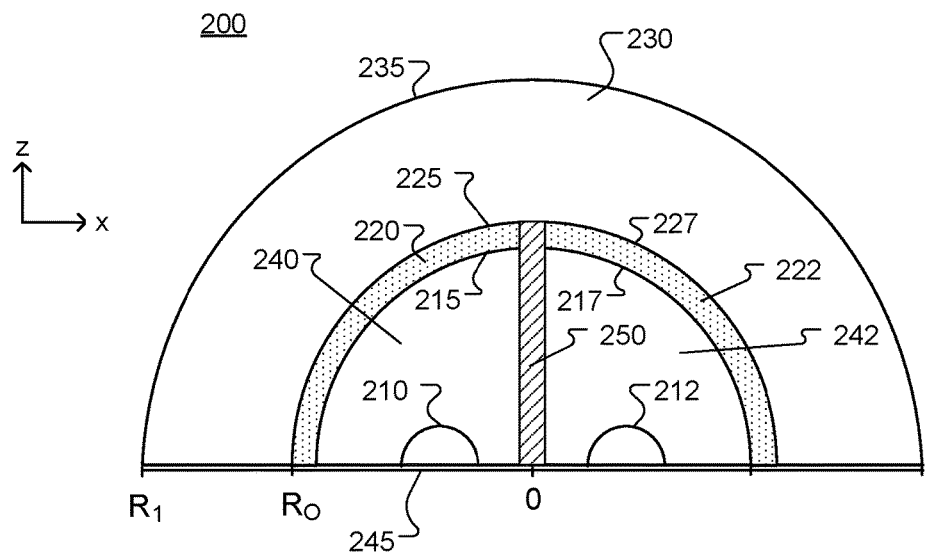
FIG. 2A shows an example of a light-emitting device with a reflective element.

FIG. 2A shows a light-emitting device 200 with a hollow hemispherical extractor element 230 that is designed to fit over a base substrate 245. The light-emitting device 200 includes at least two LEEs 210 and 212 (or a single LEE with at least two independently controlled surface emission regions) that may have different spectral outputs. Bisecting the extractor element 230 is a reflective element 250 that extends from the base substrate 245 and projects upwards until it meets the inside of the extractor element 230 thereby creating two discrete recovery enclosures 240 and 242 inside the structure. The index of refraction inside the recovery enclosure(s) is lower than the index of refraction of the hollow hemispherical dome and in some cases can be air.

Scattering elements 220 and 222 (e.g., light converting material layers) are applied to the inner surface of the hemispherical extractor element 230 such that the scattering element 220 and the scattering element 222 can have the same or different properties such as composition, diffusion, mean path length, optical density, surface structure, spectral emission/conversion, thickness or any other property that could distinguish the output of one half of the hemisphere from the other half, i.e., that differentiates the light emission properties from one region to the next.

The scattering elements 220, 222 have input surfaces 215, 217 spaced apart from the light-emitting elements 210, 212, positioned to receive light emitted from the light-emitting element 210 and 212 respectively. In this example, the recovery enclosure 240 is formed by the input surface 215, the reflective element 250, and a portion of the base substrate 245. Similarly, the recovery enclosure 242 is formed by the input surface 217, the reflective element 250, and a portion of the base substrate 245.

The scattering elements 220 and 222 are coupled to the extractor element 230 to form optical interfaces 225 and 227 respectively, including or defined by a region of contact between the scattering elements 220, 222 and the extractor element 230. The extractor element 230 receives light from the scattering elements 220, 222 through the optical interfaces 225, 227. The optical interfaces 225, 227 are opposite their respective input surfaces 215, 217 of the scattering elements 220, 222.

Generally, the extractor element 230 is formed from a transparent material, such as transparent glass or a transparent organic polymer (e.g., silicone, polycarbonate or an acrylate polymer). The extractor element 230 has a transparent exit surface 235 through which the light received by the extractor element 230 is output.

Figure 2B:
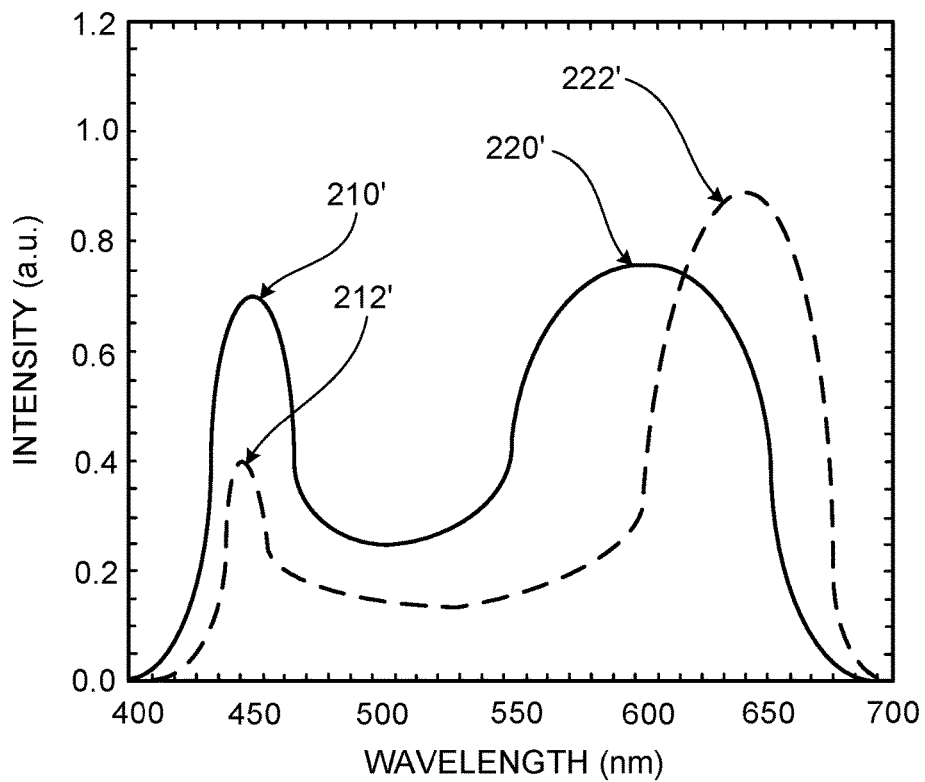
FIG. 2B shows an example of two spectral distributions output by a light-emitting device with a reflective element.

FIG. 2B illustrates an example of two different spectral combinations. The blue peak 210' emitted by LEE 210 is illustrated to be slightly different from the blue peak 212' emitted by the second LEE 212. While in some embodiments the spectral distributions of the LEEs can be the same, in other implementations, the spectral distributions of the LEEs can be different since, for example, the dominant "pump" wavelength efficiency may be optimized and better matched to the specific scattering elements (e.g., light converting materials) 220 and 222 that have respective combined response curves 220' and 222'.

These example spectral responses are for illustration purposes to show how deliberate matching of blue pump wavelengths from respective LEEs and varying light converting material properties as known in the art can create highly differentiated final spectral responses that can be independently controlled by varying the forward bias current through each LEE respectively. Other types of variation are also possible, including intensity profiles, temporal variations in phosphor decay times, and localized variations in light converting material profiles and others. Furthermore, differential drive methodologies as known in the art can be employed to also vary some properties of the respective materials or create a differential in the time averaged spectral output of the system. It is also important to note that the selection of LEEs could include non-pump type LEDs such as red emitters and the selection of the light converting materials above may not possess any wavelength converting properties and instead offer direct transmission or a range of diffusion or other optical interactions that provide a differentiated output characteristic. Some light converting materials may also exhibit various levels of scattering during wavelength conversion.

Figure 2C:
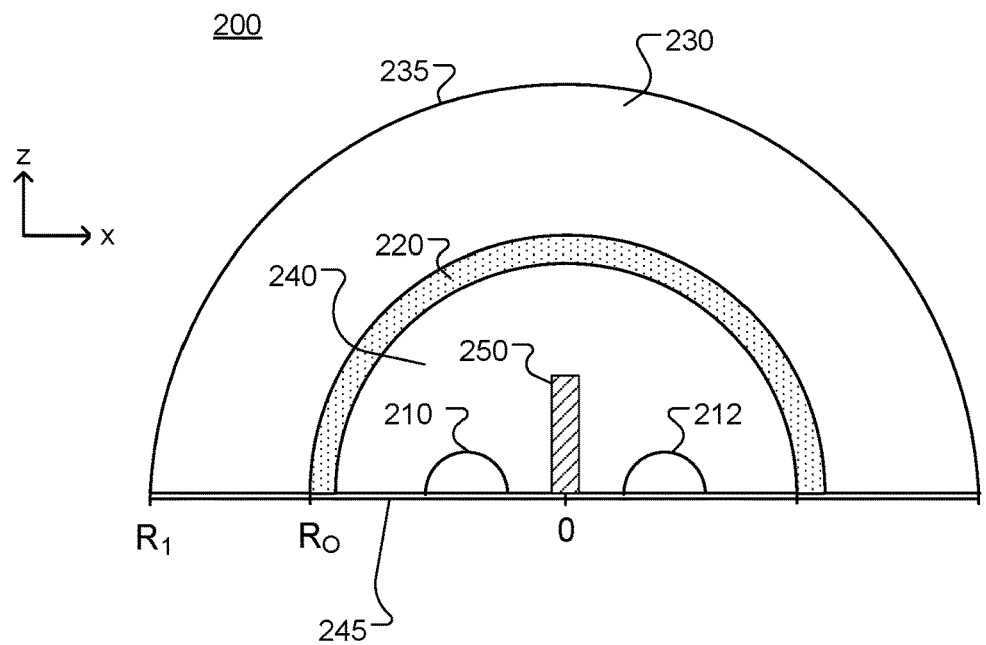
FIGS. 2C-2E show other examples of light-emitting devices with reflective elements.
Figure 2D:
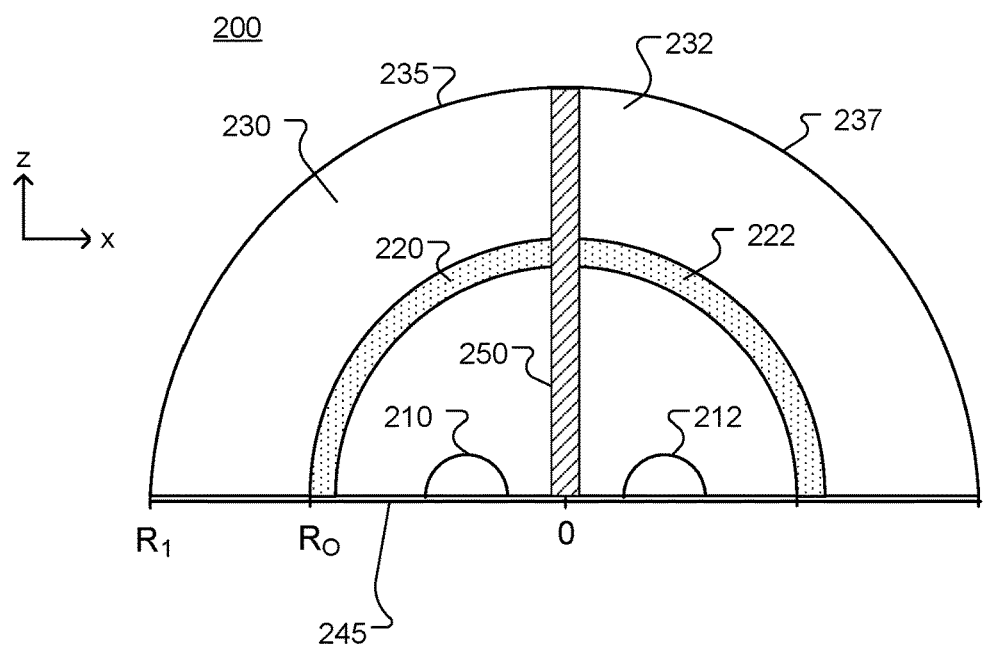

In another embodiment illustrated in FIG. 2C and FIG. 2D it is shown that the relative height of the reflective element 250 can be varied such that the height of the element can be non-existent (h=0) to a height that could extend to the outside surface of the extractor element 230, or even beyond as may be desired (not illustrated). FIG. 2D shows an example where the reflective element 250 extends to the outside surface of the extractor element 230. The reflective element 250 transects a portion of the light-emitting device 200 and provides a means to control the degree of intermixing between the sectors of the device that would impact, for example, the blending of light.

The relative height of this element controls the degree by which each LEE is mixed prior to, and after reaching the inner surface of the structure. As shown in FIGS. 2C and 2D, the near field luminance at the surface of the device can be controlled such that it is continuously variable across the surface to a virtually discontinuous change at the boundary defined by the reflective element 250. Furthermore, the reflective element 250 does not need to be a continuous sheet but could have voids for interblending of light in the lower recovery enclosure(s). The reflective element 250 may or may not have one end coincident with the plane of the base substrate 245 and therefore could start at some nominal distance above the plane as may be desired.

FIG. 2C shows an example of a light-emitting device 200 with a reflective element 250 placed between light-emitting elements 210 and 212 that extends from the base substrate 245 into a recovery enclosure 240 defined by the scattering element 220 and a portion of the base substrate 245. In this example some of the light emitted by the light-emitting elements 210 and 212 is mixed in an area above the reflective element 250, before entering the scattering element 220.

FIG. 2D shows an example of a light-emitting device 200 with a reflective element placed between light-emitting elements 210 and 212 that extends from the base substrate 245 to exit surfaces 235 and 237 of extractor elements 230 and 232 respectively. In this example, light emitted by the light-emitting element 210, or reflected by the corresponding surface of the reflective element 250 is received by the extractor element 230 through the scattering element 220 and output through exit surface 235 of the extractor element 230. Similarly, light emitted by the light-emitting element 212, or reflected by the corresponding surface of the reflective element 250 is received by the extractor element 232 through the scattering element 222 and output through exit surface 237 of the extractor element 232. Thus, the light emitted by the light-emitting element 210 and 212 respectively is not mixed before it is output from the respective exit surfaces 235 and 237.

Figure 2E:
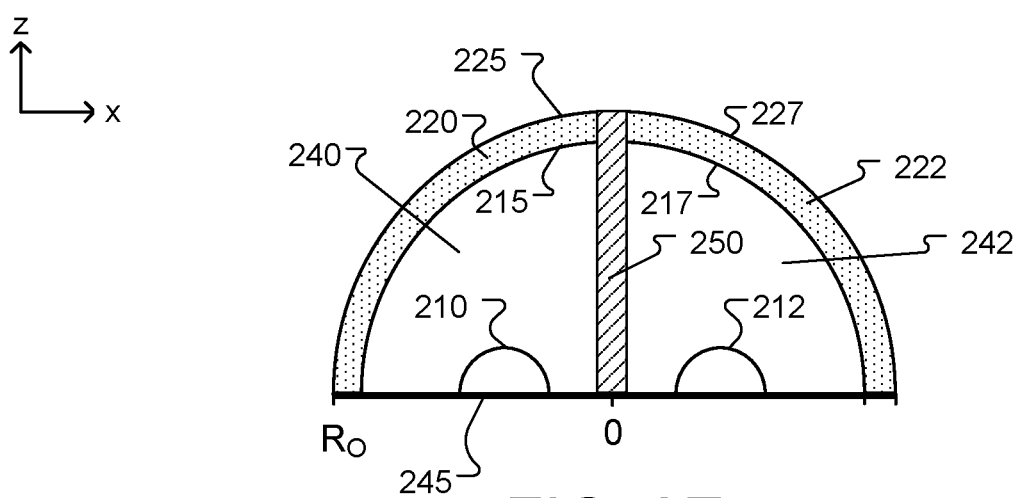

While FIGS. 2A-2D show examples of light-emitting devices that include extractor elements, other implementations of light-emitting devices as described herein may not include an extractor element. FIG. 2E shows an example of a light-emitting device 270 with a scattering element 220 through which light is output towards a target area. Light emitted by the light-emitting elements 210, 212, or reflected by the corresponding surface of the reflective element 250 is received by the input surface 215 and output through the surface 225 of the scattering element 220 as scattered light. While the reflective element 250 as shown in FIG. 2E extends from the base substrate 245 to the scattering element 220, other configurations of reflective elements are also possible. For example, the reflective element can extend from the base substrate 245, or scattering element 220, into the recovery enclosure 240 and/or extend through the scattering element 220 to the surface 225, or past the surface 225.

Figure 3A:
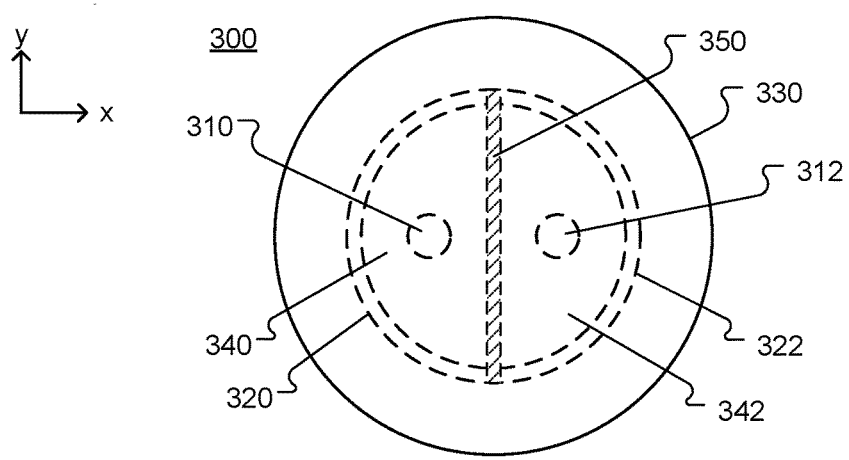
FIGS. 3A-3C show examples of light-emitting devices with reflective elements that delineate various zones.

FIG. 3A shows a light-emitting device 300 with a reflective element 350 that delineates two zones (recovery enclosures) 340, 342. The light-emitting device 300 includes LEE 310 that is disposed on a base substrate in the zone 340 and LEE 312 that is disposed on the base substrate in the zone 342. A portion of light emitted by LEEs 310 and 312 is reflected by the reflective element 350 towards corresponding portions 320 and 322 of the scattering element. An extractor element 330 is coupled with the portions 320 and 322 of the scattering element and configured to output the light received through the scattering element.

While one reflective element is shown in FIG. 3A, a light-emitting device can also include multiple reflective elements.

Figure 3B:
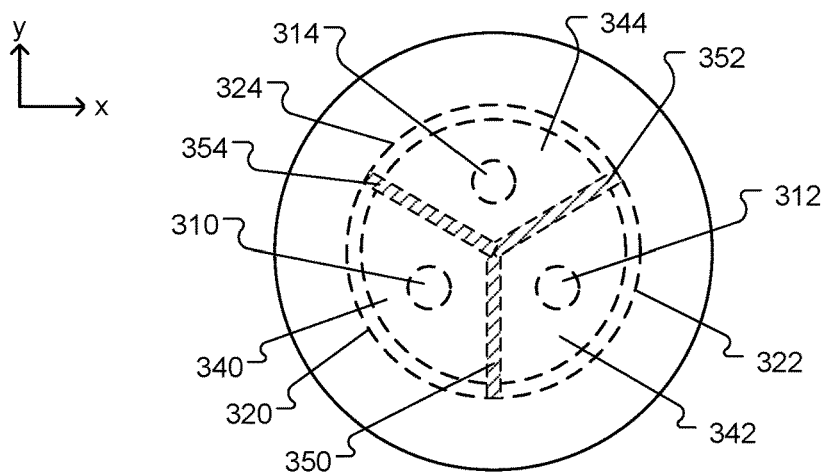

FIG. 3B shows how reflective elements 350, 352, and 354 can be structured such that they delineate 3 zones (recovery enclosures) 340, 342, and 344. Numerous zones, configurations and variations are possible, and the number and/or types of LEEs included in each zone can also be modified to create various degrees of controlled surface luminance at the outer extremity of the extractor element 330. In this example, LEE 310 is disposed in the zone 340, LEE 312 is disposed in the zone 342, and LEE 314 is disposed in the zone 344. A portion of the light emitted by LEEs 310, 312, and 314 is reflected by corresponding surfaces of the reflective elements 350, 352, and 354 towards portions 320, 322, and 324 of the scattering element. The extractor element 330 is coupled with the portions 320, 322, and 324 of the scattering element and configured to output the light received through the scattering element.

Figure 3C:
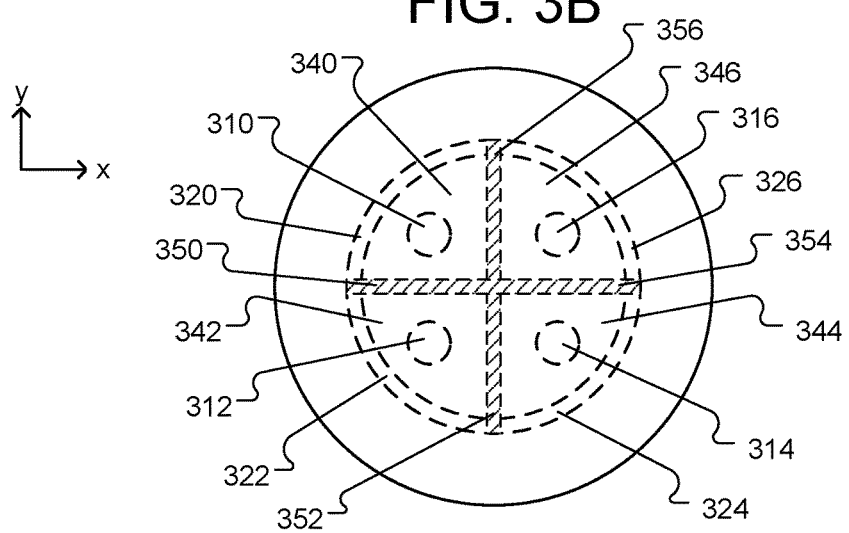

FIG. 3C illustrates 4 zones (recovery enclosures) 340, 342, 344, and 346 delineating 4 quadrants with two adjacent quadrants populated, for example, by one type of LEE 310 and the other two adjacent quadrants populated by a second type of LEE 312 (in some implementations, each zone can have different or similar types of LEEs, or any combination thereof) Furthermore, the optical and physical properties of reflective elements 350, 352, 354, and 356 are free to be individually modified in a variety of ways such that the surface luminance and relative uniformity gradients at the surface of the extractor element 330 are controlled in a desirable fashion. These reflective elements may vary in relative height along their longitudinal direction, they may be specular on one side and diffuse reflecting on the other or varied along their longitudinal directions or they may be sloped or turned into curved sections which may or may not intersect the base substrate perpendicularly.

Independent or dependent control of multiple channels of drive current to LEEs 310 and LEEs 312 can be combined in many ways to regulate light output of any of these components. When these channels are controlled in a variety of ways it is possible to significantly modify the surface luminance of the system electronically. This then can be translated through an optical system to the far field by secondary and tertiary optical elements such that the far field illuminance and spectral content can be controlled in a manner that optimizes the visual and non-visual impact of the illumination.

In this example, LEE 310 is disposed in the zone 340, LEE 312 is disposed in the zone 342, LEE 314 is disposed in the zone 344, and LEE 316 is disposed in zone 346. A portion of the light emitted by LEEs 310, 312, 314, and 316 is reflected by corresponding surfaces of the reflective elements 350, 352, 354, and 356 towards portions 320, 322, 324, and 326 of the scattering element. The extractor element 330 is coupled with the portions 320, 322, 324, and 326 of the scattering element and configured to output the light received through the scattering element.

In another embodiment, recent research in human response to lighting is showing that humans have evolved such that they are profoundly psychologically and physiologically influenced by the non-visual component of light. In this case, certain wavelengths of light as encountered in nature are pre-disposed to be collected by specific retinal ganglion cells in the human eye that are located within the eye that corresponds to certain angular input angles relative to the eye's normal direction of view to the horizon.

Figure 4A:
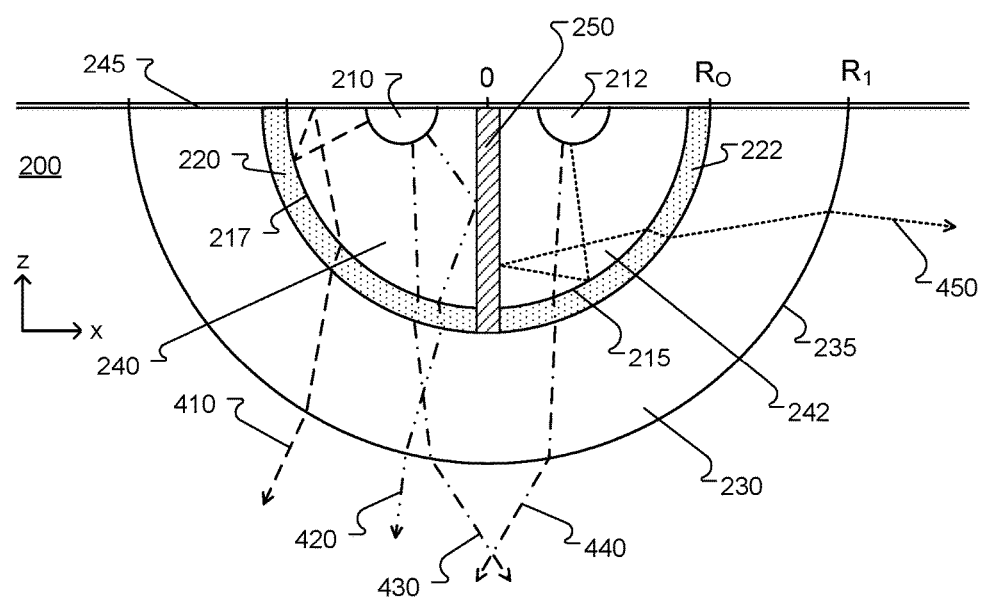
FIG. 4A shows another example of a light-emitting device with a reflective element.
Figure 4B:
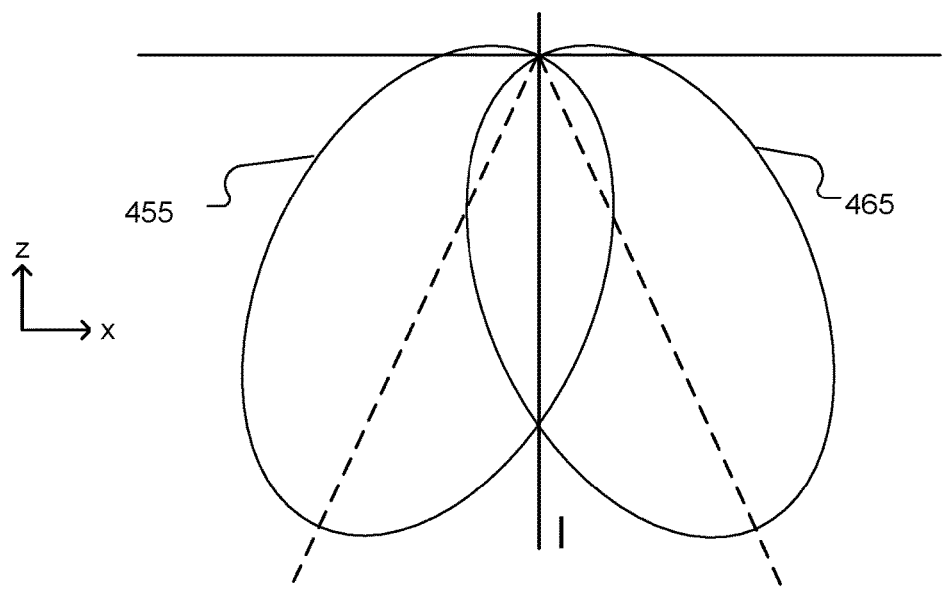
FIGS. 4B-4C show light output distributions of a light-emitting device with a reflective element.
Figure 4C:
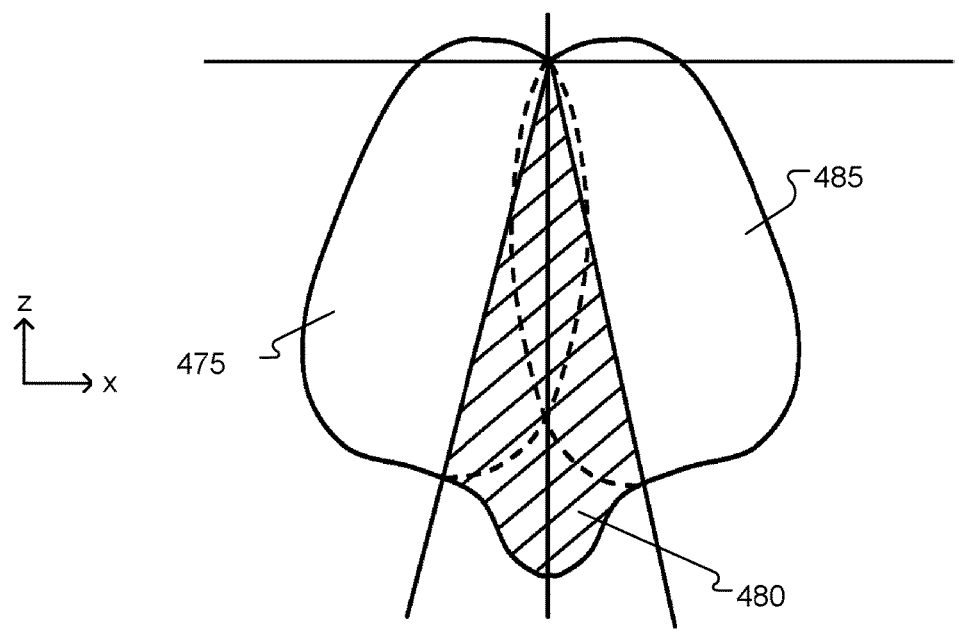

FIG. 4A shows an example of a light-emitting device 200 with a reflective element. FIG. 4B schematically shows example component light output distributions associated with two portions of the light-emitting device 200. FIG. 4C schematically shows superimposed total light output distributions of the light-emitting device 200. The light-emitting device 200 creates two different distributions 455 and 465 that radiate in different directions and that could be used to provide for angularly differentiated light distributions within an illuminated environment. The spectral content present in 455 and 465 can be different and their two distributions follow the principle of superposition such that they create a melded intensity distribution 475 and 485 as shown in FIG. 4C. The left side of the distribution is thus differentiated from the right side distribution in a fairly smooth transition region 480, depicted by where the two line patterns merge, that can be oriented such that the one hemisphere 475 distribution is substantially directed to one side of a plane that coincides with the central axis and the second hemisphere 485 is substantially directed to the other side of the same plane.

The light-emitting device 200 includes a base substrate 245, LEEs 210 and 212, scattering elements 220 and 222, extractor element 230, and reflective element 250. LEE 210 is disposed on the base substrate 245 in a recovery enclosure 240 that is formed by a portion of the base substrate 245, the scattering element 220, and the reflective element 250. LEE 212 is disposed on the base substrate 245 in a recovery enclosure 242 that is formed by a portion of the base substrate 245, the scattering element 222, and the reflective element 250. The scattering element 220 includes a surface 217 that faces the LEE 210 and the scattering element 222 includes a surface 215 that faces the LEE 212.

For example, LEE 210 outputs rays 410, 420, and 430, and LEE 212 outputs rays 440 and 450. Rays 410 and 430 directly impinge on the surface 217 of the scattering element 220, and rays 440 and 450 directly impinge on the surface 215 of the scattering element 222. Ray 430 passes through the scattering element 220 into the extractor element and is output through exit surface 235 of the extractor element. Ray 410 is backscattered into the recovery enclosure 240, redirected by the base substrate 245 towards the scattering element 220 and output through the exit surface 235 of the extractor element. Ray 420 impinges on the reflective element 250 and is redirected by the reflective element 250 towards the scattering element 220. Ray 450 is backscattered into the recovery enclosure 242 and redirected by the reflective element towards the scattering element 222. Rays 410 and 420 are a representative portion of the distribution 475 and ray 450 is a representative portion of the distribution 485. Rays 430 and 440 are representative portions of the transition distribution 480.

The addition of external optics can further transform either side of the radiation pattern into a narrower or wider distribution as may be required, while observing the preservation of etendue through the system. By selecting a preferred spectral distribution for biological properties for either 475 or 485 it can be appreciated that the orientation of the light-emitting device, along with external optical control surfaces can provide for selective spatial distributions within the space that correspond to preferred angles of incidence for human biological effectiveness.

Figure 5:
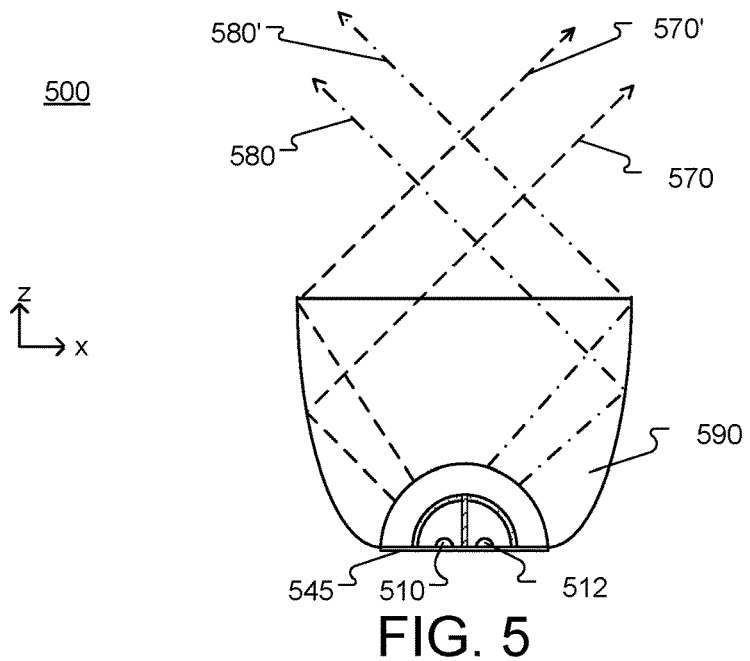
FIG. 5 shows an example of a light-emitting device with a secondary optic.

FIG. 5 shows how an example of how a distribution in the left part of the light-emitting device 500 could be manipulated by a secondary optic 590 such that the bundle of rays 570, 570' emit primarily to the right from the reflector and vice versa for the bundle of rays 580, 580'. If a control circuit is combined with this system then it is possible to electronically manipulate both the spectral content and the coarse far field photometric distribution of light. The methods for controlling light are well understood in the art and can include signals from a central control system or from one or more sensors including occupancy sensors, cameras or other devices that are brought to the control input point of the controller. Within the controller, logic circuits and optional program code can independently or inter-dependently control two or more external circuits that correspond to light-emitting elements 510 and 512 (disposed on a base substrate 545) which will then affect the left or right spectral content and their relative amplitudes within the light-emitting device.

A light-emitting device can be coupled with optical mixing structures to create a uniform emission of blended light. Such mixing structures can be used to blend the geometrical and spectral output of different lamps into light that has a certain chromaticity distribution, flux distribution or both chromaticity and flux distribution across the exit face 698. Many different mixing structures can be envisioned, including coupling optics that collect the emitted light and introduce it into a hollow or solid light-guide where at least a few aspect ratios of internal mixing are encountered before final emission. The notion of aspect ratio is defined in this case to be the numerical ratio of guide length and smallest guide cross sectional dimension.

Figure 6:
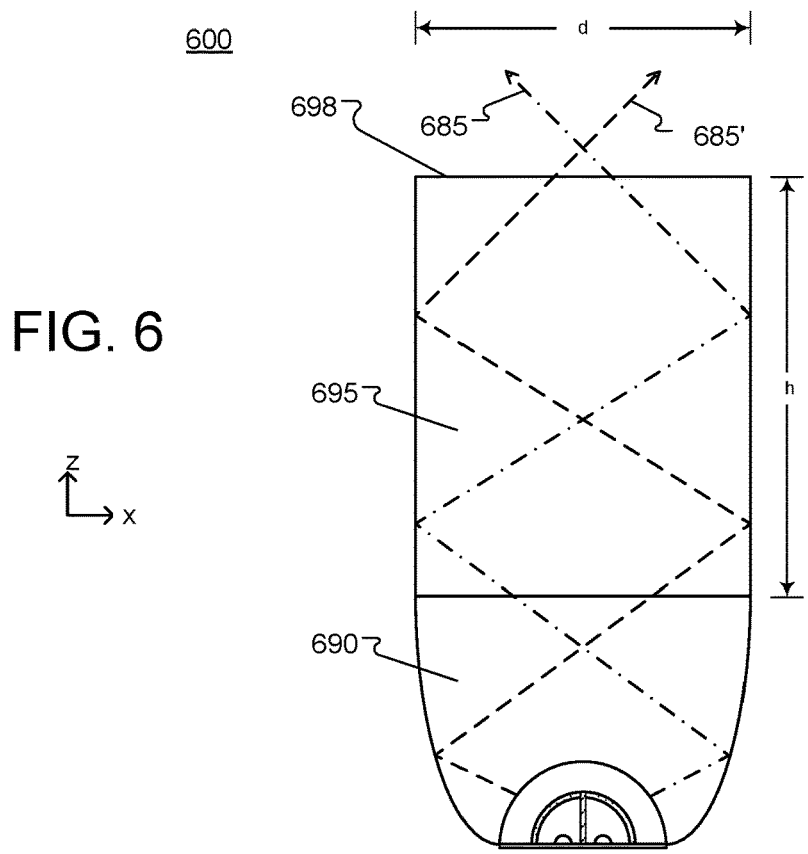
FIG. 6 shows an example of a light-emitting device with a light-guide.

In FIG. 6 this ratio is defined as the ratio of h divided by d. An example device 600 includes a coupling optic 690 that surrounds a light-emitting device, such as light-emitting device 200, and collects and introduces the light into a waveguide 695 where it is guided via total internal reflection (TIR) or by specular reflection from side walls until it reaches an exit surface 698 where it can be utilized by additional optical components or allowed to radiate into the space. Under appropriate input and geometric conditions, light rays 685, 685' are mixed such that their overall radiation pattern at 698 is well homogenized with low losses along the guide. For typical input insertion angles between 30 and 40 degrees from the axis of the light-guide, aspect ratios greater than 5 will result in homogenization that is usually better than 90% across surface 698.

Adjustments to aspect ratio relative to mean input insertion angles can be made in the design to achieve the desired level of mixing to suit the illumination requirements. Lower ratios can also be used. Further, microscopic optical structures can be used, or the outer walls of the light-guide can be shaped, or structures within the guide or at the exit of the guide can provide additional reflection components to improve the result for desired homogeneity. It is also noted that the utilization of the light at the exit surface 698 can be coupled into other optical structures that can manipulate the beam pattern, including splitting it into multiple radiation patterns, for subsequent use within a space. Shorter aspect ratios can also add value by providing varying degrees of mixing such that inhomogeneity is preserved for later use in downstream optical systems.

Figure 7A:
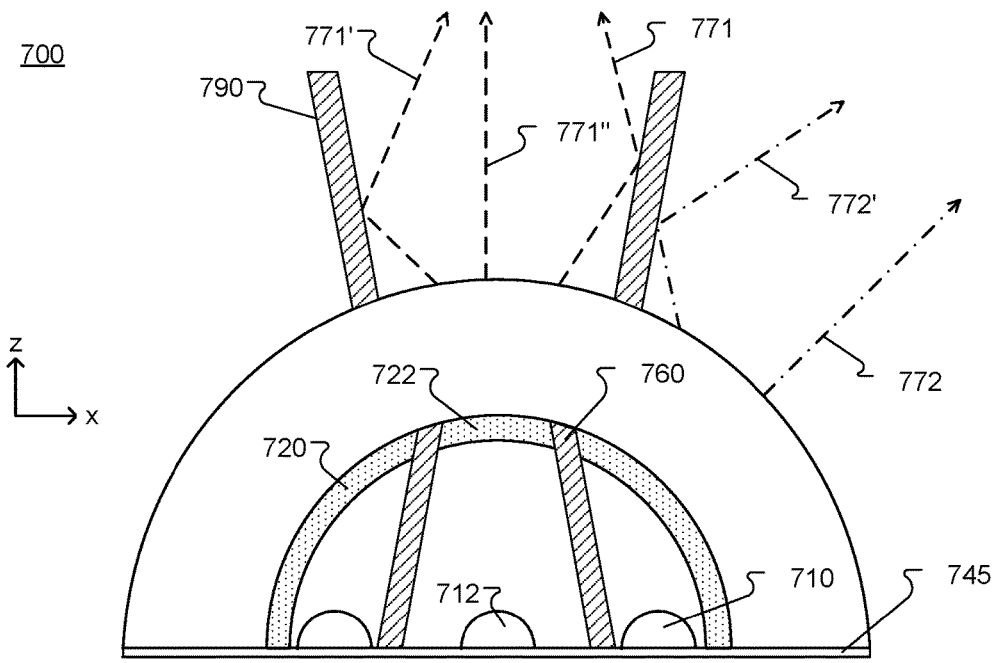
FIGS. 7A-7B show an example of a light-emitting device with multiple reflective elements.
Figure 7B:
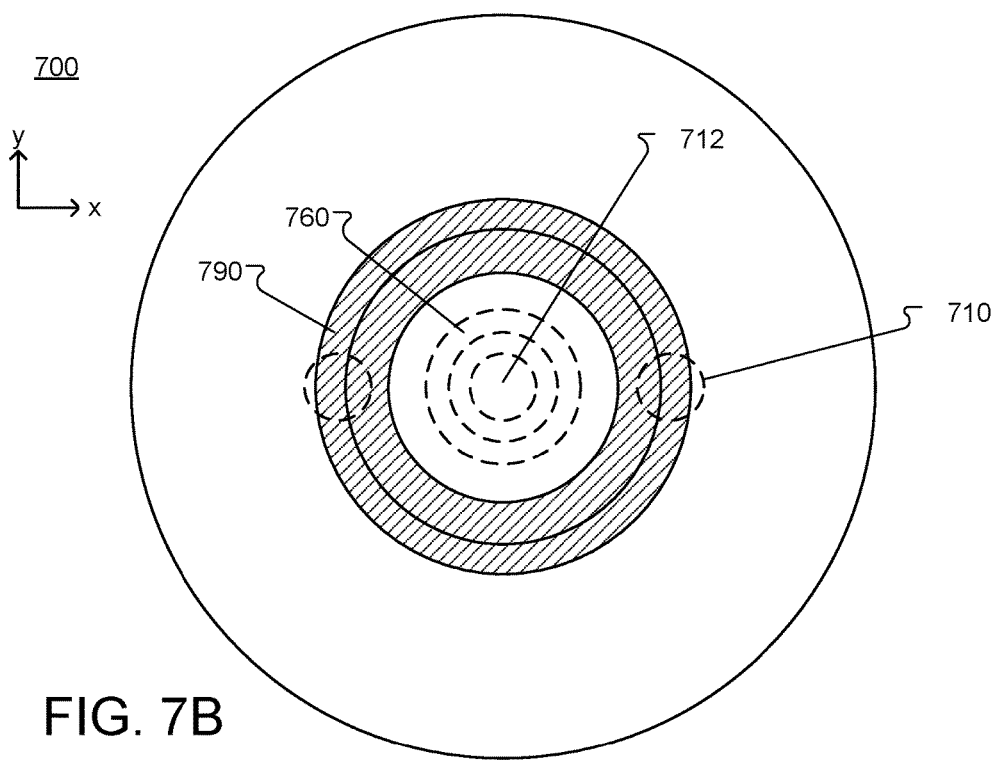

FIGS. 7A and 7B show another embodiment 700 with a non-linear reflective element 760 that is non-perpendicular to a plane of substrate 745. Here the reflective element 760 is a shown as roughly a conic section that condenses light flux from LEE 712 to a portion 722 of a scattering element near the top center of the dome. This can create a localized source of luminance 771, 771', 771", which could be roughly captured and directed in one direction by secondary optical elements 790. In this case, the optical elements 790 could be directing light downwards from a ceiling and constitute the provision of localized task illumination, for example. The optical elements 790 may be specular and could be curved to aid in capture and re-direction of light flux downwards in a prescribed nominal controlled beam pattern.

The illumination 772, 772' provided by a combination of light from light-emitting element 710 and a portion 720 of the scattering element inhabits the lower spatial angles of the hemisphere and can therefore be used to provide a differentiated spectrum of higher angle light to the space. Other optical surfaces could be employed in regions or zones to modify the light distributions into the space as desired.

Optionally, the reflective element 790, or secondary reflectors could redirect and provide an element of optical control to address glare for a flux output 772, 772'. The embodiment of FIGS. 7A and 7B could be utilized within a ceiling luminaire that has electronically controllable contributions in both spectral output and spatial zones to the task illumination and independently to the higher angle fill light. Furthermore, flux output 772, 772' may be created as a variably tunable biologically active contributor to the space so that the spectral contribution to the higher angles varies throughout the day via a program that is resident either remotely or locally within a controller. For example, a higher blue content type of light could be directed to radiate more towards the ceiling while lower blue content type of light could be reserved for downwards emission towards tasks.

In some implementations, the light output of one or more light-emitting elements of a light-emitting device can be controlled independently. By controlling the electrical current passing through each of the LEEs it is possible to electronically vary the respective spectral compositions such that the overall integrated composition of light from the assembly can be varied, or tuned, between the spectral power distributions. If an optical structure with diffuse internal surfaces and a correctly specified diffuse transmission property is employed with the light-emitting device then a uniform emission of blended light can be created. Such structures can, for example, blend the geometrical and spectral output of different lamps into a homogenous surface luminance at the exit face.

Figure 8:
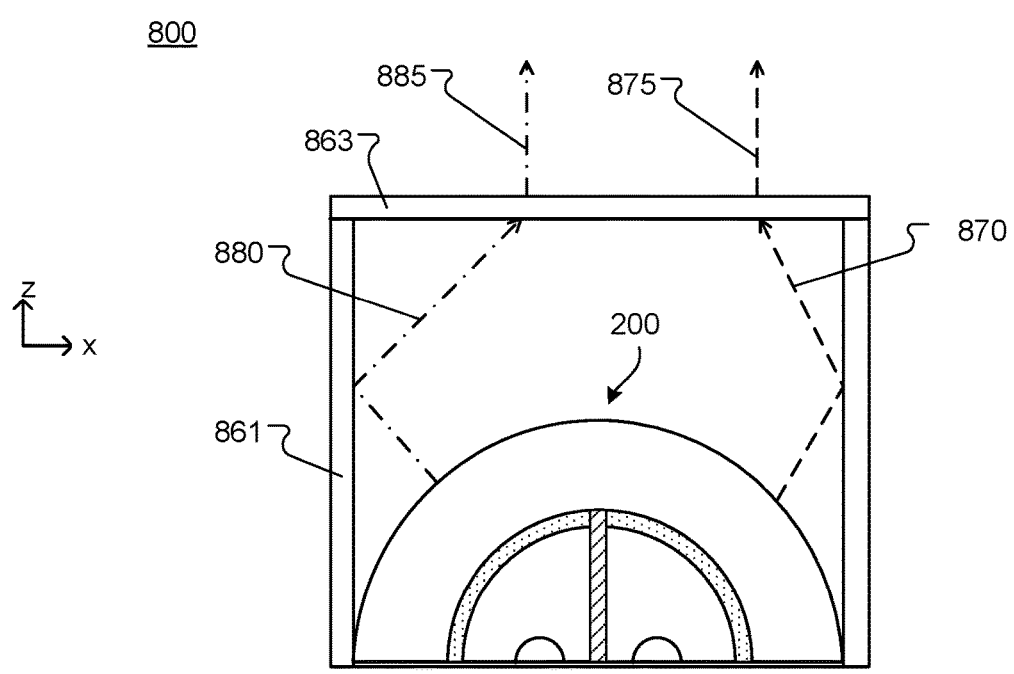
FIG. 8 shows an example of a light-emitting device with a reflective mixing structure.

FIG. 8 shows an illumination device 800 with an internally diffusively reflective mixing structure 861 with a diffusely transmissive exit window material 863 that effectively mixes the emitted light spectral contributions 870 and 880 of a light-emitting device, such as light-emitting device 200, internally such that there is a composite emission of radiation 875, 885 from the apparatus.

Figure 9:
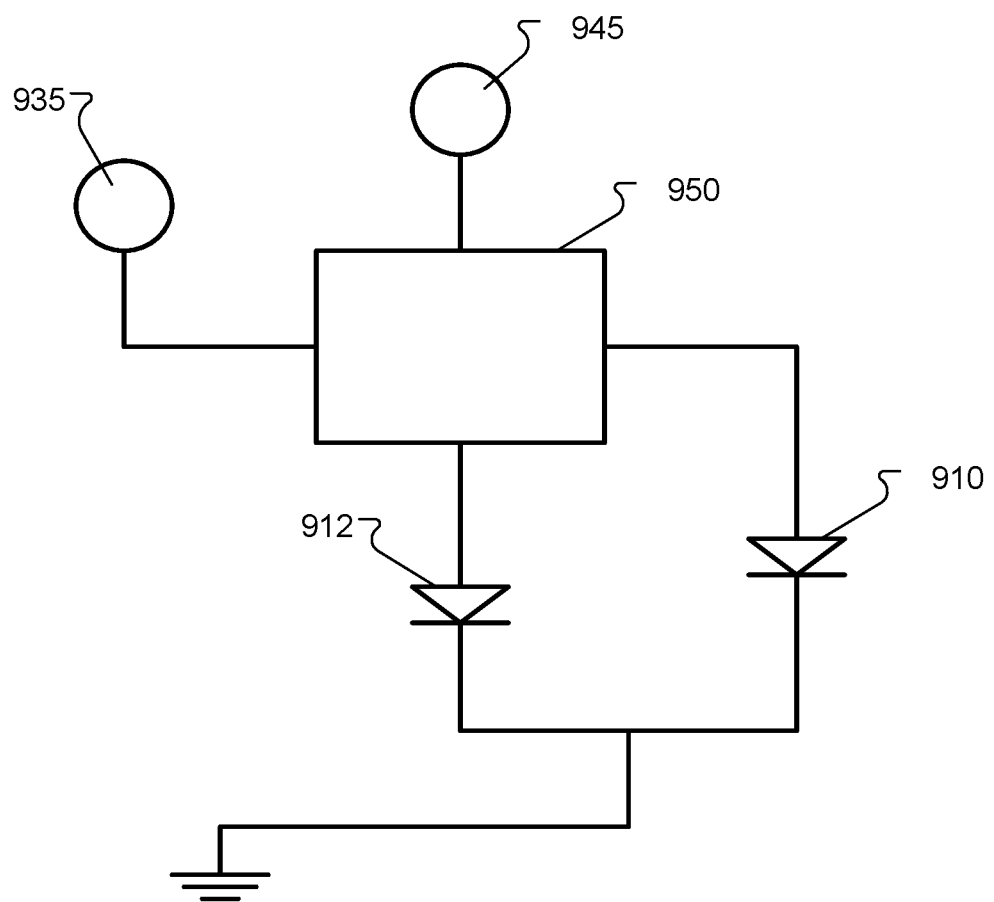
FIG. 9 shows an example of an electronic control module to control various light-emitting elements.

FIG. 9 shows an example of an electronic control block 900 that can be configured to control light-emitting elements 910 and 912. Multiple LEE's can be included in each leg of control and furthermore, additional channels of control could be added to enable additional levels of control of surface luminance. Controller 950 derives power from a point 935 which can be optionally a source of alternating current, or a form of direct current or combinations thereof, and uses control signal 945 as an input to control the relative power delivered to the light-emitting elements 910 and 912 as may be defined within the control code or by design.

As discussed herein, independent control of LEEs within a light-emitting device can be used to adjust a light output of the light-emitting device with respect to the needs and/or activities of a user. Furthermore, independent control of LEEs can be used to balance the light output of the light-emitting device over the lifetime of the light-emitting device. Properties (e.g., material properties) of solid state light-emitting devices may change over their lifetime. For example, the white point of a white LED can vary as the device ages. Accordingly, in some implementations, light-emitting devices can include intra-device feedback that enables a device to self-compensate for aging effects. In some implementations, a light-emitting device includes one or more sensors that can monitor certain electrical or other system parameters and/or the intensity of light generated by the light-emitting device. The light-emitting device can include feedback electronics (e.g., within the base of the device) that modify the potential applied to one or more light-emitting element(s) in response to variations in the detected intensity.

The term "light-emitting element" (LEE), also referred to as a light emitter, is used to define any device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A light-emitting element can have monochromatic, quasi-monochromatic, polychromatic or broadband spectral emission characteristics. Examples of light-emitting elements include semiconductor, organic, polymer/polymeric light-emitting diodes (e.g., organic light-emitting diodes, OLEDs), other monochromatic, quasi-monochromatic or other light-emitting elements. Furthermore, the term light-emitting element is used to refer to the specific device that emits the radiation, for example a LED die, and can equally be used to refer to a combination of the specific device that emits the radiation (e.g., a LED die) together with a housing or package within which the specific device or devices are placed. Examples of light emitting elements include also lasers and more specifically semiconductor lasers, such as vertical cavity surface emitting lasers (VCSELs) and edge emitting lasers. Further examples include superluminescent diodes and other superluminescent devices.

As described herein, a scattering element can include elastic scattering centers, inelastic scattering centers, or both. In general, inelastic scattering entails emission of light from a scattering center in effect of absorption of light by the scattering center. With respect to the instant technology, inelastic scattering typically is associated with one visible or ultraviolet (UV) incoming photon and one visible outgoing photon. Scattering of light by a scattering center can result from effects such as light conversion, refraction, and/or other effect and/or combination thereof. The distribution of a plurality of outgoing photons that result from inelastic scattering at a single scattering center can be isotropic depending on, for example, the ability of the scattering centers to perform light conversion. The distribution of a plurality of outgoing photons that result from elastic scattering at multiple scattering centers can be isotropic depending on, for example, shapes, arrangements and/or compositions of the scattering centers.

A scattering center can include one or more portions that each scatter light in one or more ways, for example, by light conversion, refraction or other effect. Scattering centers include discontinuities in the composition or structure of matter. In order to achieve a predetermined degree of randomness in its propagation, light may have to undergo multiple elastic scattering events. As such multiple scattering events may be required to achieve a predetermined randomness in the propagation of the light emitted from a scattering element, for example, when the light is scattered by interaction with scattering centers that scatter light merely by refraction. Scattering centers can include light-converting material (LCM) and/or non-light converting material, for example. As used herein, light conversion via LCM is considered a form of inelastic scattering.

LCM is a material, which absorbs photons according to a first spectral distribution and emits photons according to a second spectral distribution. The terms light conversion, wavelength conversion and/or color conversion are used interchangeably. Light-converting material is also referred to as photoluminescent or color-converting material, for example. As used herein, light-converting materials can include photoluminescent substances, fluorescent substances, phosphors, quantum dots, semiconductor-based optical converters, or the like. Light-converting materials also can include rare earth elements.

Moreover, while the scattering element is shown in the figures with a constant thickness (e.g., uniform thickness,) the thickness of the scattering element can also vary. Variations of the thickness of the scattering element may be used to vary scattering or other properties of the scattering element or the scattered light provided by the scattering element, for example.

Recovery enclosure(s) of light-emitting devices described herein can include a medium, such as a gas (e.g., air), adjacent a first surface of a scattering element having a refractive index n0, and the scattering element includes a material having a first refractive index n1, where n0<n1. Light from the scattering element that reaches the first surface is referred to as backward light. Because n0<n1, the first surface allows only a fraction of the backward light to escape into the low-index medium. The transparent material of an extractor element coupled with the scattering element has a refractive index n2, where n0<n2. As such, the amount of transmitted forward light is greater than the amount of backward light transmitted into the low index medium, and the light-emitting device asymmetrically propagates scattered light.

In such a case, depending on the degree of asymmetry between n1/n0 and n2/n1 varying ratios of forward to backward light transmission can be provided. It is believed that the maximum asymmetry in forward to backward light transmission is reached if n2 is equal to n1 (no mismatch for forward transmission) and n0<<n1 (large mismatch for backward transmission). Light emitting devices that feature asymmetric optical interfaces (i.e., different refractive index mismatches) on opposing sides of the scattering element are referred to as asymmetric scattering light valves (ASLV), or ASLV light-emitting devices.

The exit surface of the extractor element is a transparent surface on which the scattered light that directly impinges on the exit surface experiences little or no total internal reflection (TIR). In this manner, the exit surface transmits a large portion of light impinging thereon that directly propagates thereto from the scattering element and propagates in at least certain planes and outputs it into the ambient of the extractor element on first pass. The light output through the exit surface can be used for illumination or indication functions provided by light-emitting devices or for further manipulation by another optical system that works in conjunction with a light-emitting device.

In some embodiments, the exit surface of the extractor element is shaped as a spherical (e.g., hemisphere or partial sphere) or a cylindrical dome or shell with a radius R1 in which the optical interface is disposed within an area defined by a respective notional sphere or cylinder that is concentric with the exit surface and has a radius $R_{OW}$=R1/n2, wherein n2 is the refractive index of the extractor element. Such a configuration is referred to as Weierstrass geometry or Weierstrass configuration. It is noted that a spherical Weierstrass geometry can avoid TIR for rays passing through the area circumscribed by a corresponding notional R1/n2 sphere irrespective of the plane of propagation. A cylindrical Weierstrass geometry can exhibit TIR for light that propagates in planes that intersect the respective cylinder axis at shallow angles even if the light passes through an area circumscribed by a corresponding notional $R_{OW}$=R1/n2 cylinder.

It is noted that other light-emitting devices described in this specification have exit surfaces with other shapes and/or other geometrical relations with respect to the optical interface. For instance, a non-spherical or non-cylindrical exit surface of the extractor element can be employed to refract light and aid in shaping an output intensity distribution in ways different from those provided by a spherical or cylindrical exit surface. The definition of the Weierstrass geometry can be extended to include exit surfaces with non-circular sections by requiring that the optical interface falls within cones, also referred to as acceptance cones, subtended from points p of the exit surface whose axes correspond to respective surface normals at the points p and which have an apex of 2*Arcsin(k/n), wherein k is a positive number smaller than n.

It is noted that the exit surface needs to be configured such that the plurality of all noted cones circumscribe a space with a non-zero volume. It is further noted that k is assumed to refer to a parameter that determines the amount of TIR at an uncoated exit surface that separates an optically dense medium, having n>1, on one side of the exit surface making up the extractor element from a typical gas such as air with n~1.00 at standard temperature and pressure conditions, on the opposite side of the exit surface.

Depending on the embodiment, k can be slightly larger than 1 but is preferably less than 1. If k>1, some TIR may occur at the exit surface inside the extractor element. In some embodiments, this results in the optical interface being at least R(p)*(1−k/n) away from the exit surface in a direction normal to the exit surface at a point p thereof. Here, R(p) is the local radius of curvature of the exit surface at the point p, and n is the refractive index of the extractor element.

For a spherical or cylindrical exit surface with k=1, the boundaries circumscribed by the noted cones correspond with a spherical or cylindrical Weierstrass geometry, respectively. Some embodiments are configured to allow for some TIR by choosing k>1. In such cases, k/n is limited to k/n<0.8, for example.

In summary, a light-emitting device is said to satisfy the Weierstrass configuration if a radius $R_O$ of the optical interface is less than or equal to $R_O \leq R_{OW}$=R1/n2, where R1 and n2 respectively are the radius and index of refraction of the extractor element. Equivalently, the extractor element of a light-emitting device is said to satisfy the Weierstrass configuration if a radius $R_1$ of an extractor element, which has an index of refraction n2, is equal to or larger than $R_1 \geq R_{1W}$=n2$R_O$, where $R_O$ is the radius of the optical interface of the light-emitting device.

In some embodiments, the exit surface is shaped such that an angle of incidence on the exit surface of the scattered light that directly impinges on the exit surface is less than the Brewster angle. In this case, k is not just smaller than 1 to avoid TIR at the exit surface of the extractor element for light propagating in at least one plane, but k is made so small that certain Fresnel reflections are additionally avoided. In such a case, k is chosen to be smaller than $n2(1+n2^2)^{-1/2}$. For example, with respect to light propagating in planes of symmetry of spherical or cylindrical Weierstrass geometries, rays that propagate through an area circumscribed by a concentric notional sphere or cylinder of radius R0=R1(1+n2$^2$)$^{-1/2}$, will impinge on the exit surface at or below the Brewster angle. More generally, p-polarized light that impinges at a point p of the exit surface from within directions bound by a cone subtended from the point p with apex 2*Arctan(1/n) whose axis corresponds with the surface normal at the point p will not be reflected at the exit surface. Such a configuration is referred to as Brewster geometry (or Brewster configuration), or more specifically a Brewster sphere or a Brewster cylinder, for example. In such embodiments the distance between the exit surface and the optical interface is larger than $R1(1-(1+n2^2)^{-1/2})$.

In summary, a light-emitting device is said to satisfy the Brewster configuration if a radius $R_0$ of the optical interface is less than or equal to $R_O \leq R_{OB}$=R1(1+n2$^2$)$^{-1/2}$, where $R_1$ and n2 are the radius and index of refraction of the extractor element. Note that for a given radius $R_1$ of the extractor element, an optical interface of the light-emitting device that satisfies the Brewster condition has a maximum radius $R_{OB}$ that is smaller than a maximum radius $R_{OW}$ of an optical interface of the light-emitting device that satisfies the Weierstrass condition. Equivalently, the extractor element of index of refraction n2 is said to satisfy the Brewster configuration if a radius $R_1$ of the extractor element is equal to or larger than $R_1 \geq R_{1B}$=$R_O$(1+n2$^2$)$^{+1/2}$, where $R_O$ is the radius of the optical interface of the light-emitting device. Note that for a given radius $R_O$ of the optical interface of the light-emitting device, an extractor element that satisfies the Brewster condition has a minimum radius $R_{1B}$ that is larger than a minimum radius $R_{1W}$ of an extractor element that satisfies the Weierstrass condition.

Moreover, a light-emitting device can be fabricated using conventional extrusion and molding techniques and conventional assembly techniques, as described below in this specification for specific embodiments. Components of the light-emitting device can include one or more organic or inorganic materials, for example acrylic, silicone, polypropylene (PP), polyethylene terephthalate (PET), polycarbonate, polyvinylidene fluoride such as Kynar™ lacquer, acrylic, rubber, polyphenylene sulfide (PPS) such as Ryton™, polysulfone, polyetherimide (PEI), polyetheretherketone (PEEK), polyphenylene oxide (PPO) such as Noryl™, glass, quartz, silicate, adhesive, other polymers organic or inorganic glasses and/or other materials.

A number of embodiments have been described. Other embodiments are in the following claims.

What is claimed is:

1. A light-emitting device, comprising:
   a base substrate;
   a plurality of light-emitting elements (LEEs) disposed on the base substrate;
   a plurality of first optical elements, each first optical element of the plurality of first optical elements having a first surface spaced apart from the plurality of LEEs, positioned to receive light from one or more of the plurality of LEEs, and configured to scatter light passing therethrough;
   a plurality of second optical elements, each second optical element of the plurality of second optical elements having an exit surface, being transparent and optically coupled with a respective first optical element, and arranged to receive light therefrom; and
   one or more reflective elements disposed between LEEs of the plurality of LEEs, the one or more reflective elements having reflective surfaces arranged to reflect portions of light emitted from the plurality of LEEs, and wherein the one or more reflective elements separate adjacent second optical elements.

2. The light-emitting device of claim 1, wherein each of the reflective elements has reflective surfaces opposing each other.

3. The light-emitting device of claim 1, wherein each of the reflective elements extends through exit surfaces of adjacent second optical elements.

4. The light-emitting device of claim 1, wherein the reflective elements extends from the second optical elements toward the base substrate.

5. The light-emitting device of claim 1, wherein the reflective surfaces of the reflective elements are arranged perpendicular to the base substrate.

6. The light-emitting device of claim 1, wherein the reflective surfaces of the reflective elements are planar.

7. The light-emitting device of claim 1, wherein power to one or more LEEs disposed on one side of one of the reflective elements and one or more LEEs disposed on opposing side of the one of the reflective elements is controlled independently.

8. The light-emitting device of claim 1, wherein power to each LEE of the plurality of LEEs is controlled separately.

9. The light-emitting device of claim 1, wherein each of the first optical elements is configured to isotropically scatter light passing therethrough.

10. The light-emitting device of claim 1, wherein each of the first optical elements comprises inelastic scattering centers.

11. The light-emitting device of claim 1, wherein each of the first optical elements comprises elastic scattering centers.

12. The light-emitting device of claim 1, wherein one or more of the LEEs disposed on one side of one of the reflective elements are configured to provide light having a first spectral power distribution, and one or more of the LEEs disposed on opposing side of the one of the reflective elements are configured to provide light having a second spectral power distribution different from the first spectral power distribution.

13. The light-emitting device of claim 1, wherein at least two of the LEEs disposed on one side of one of the reflective elements have different spectral power distributions and the at least two of the LEEs are independently controlled.

14. The light-emitting device of claim 13, wherein at least two of the LEEs disposed on opposing side of one of the reflective elements have different spectral power distributions and the at least two of the LEEs are independently controlled.

15. The light-emitting device of claim 1, wherein the base substrate has a reflective base surface facing the first optical elements.

16. The light-emitting device of claim 15, wherein the base surface is planar.

17. The light-emitting device of claim 15, wherein the base surface comprises specular reflective portions.

18. The light-emitting device of claim 15, wherein the base surface comprises diffuse reflective portions.

19. The light-emitting device of claim 1, wherein each of the first optical elements has a substantially uniform thickness.

20. The light-emitting device of claim 1, wherein the exit surface of each of the second optical elements is shaped such that an angle of incidence on the exit surface of the light provided by a corresponding first optical element that directly impinges on the exit surface is less than a critical angle for total internal reflection.

21. The light-emitting device of claim 1, wherein an axis of symmetry of the each first optical element and an axis of symmetry of a corresponding second optical element are collinear.

22. The light-emitting device of claim 1, wherein the exit surface of each of the second optical elements has a spherical shape.

23. The light-emitting device of claim 1, wherein a medium adjacent to the first surfaces is a gas.

* * * * *